A. DE VILBISS.
BONE FORCEPS OR THE LIKE.
APPLICATION FILED JAN. 19, 1912.
1,040,523.
Patented Oct. 8, 1912.
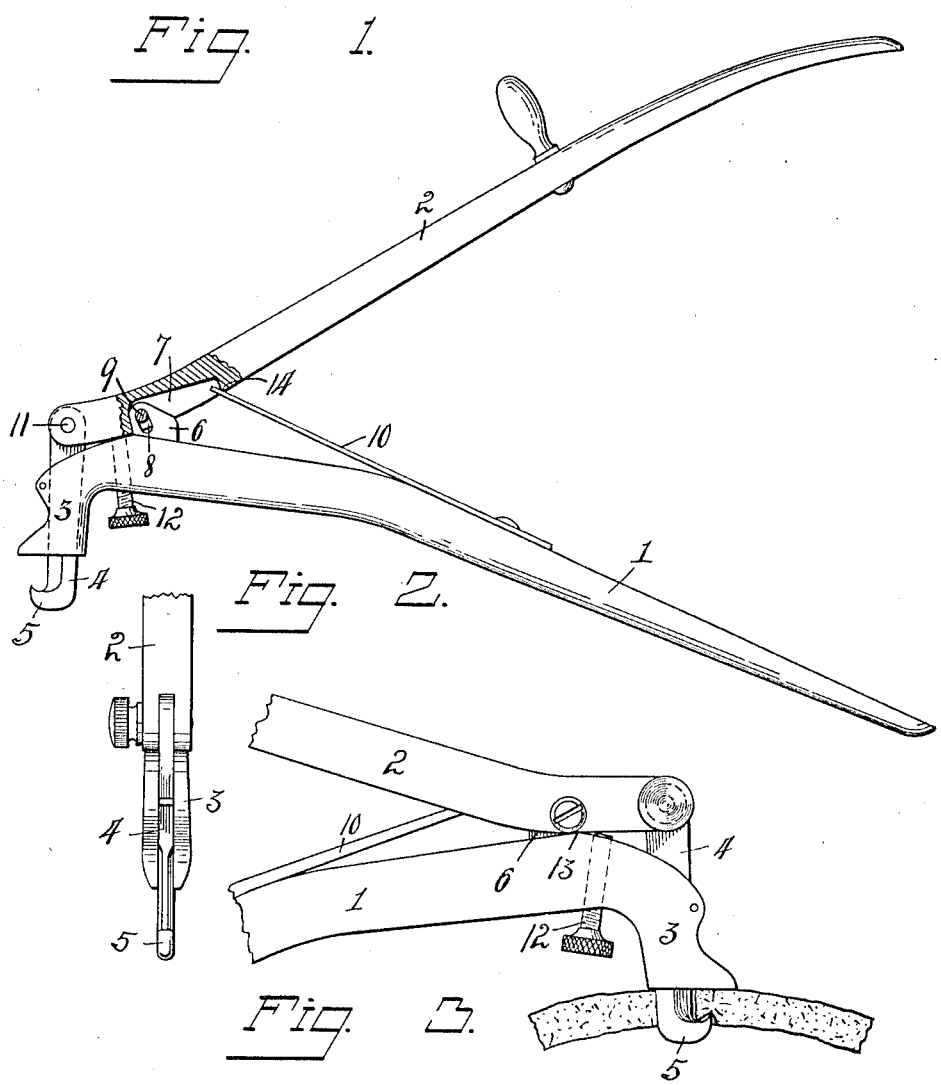
WITNESSES:
C. H. Bills.
M. L. Oppenheim.
INVENTOR.
Allen DeVilbiss,
By Owen & Owen,
His attys.

UNITED STATES PATENT OFFICE.

ALLEN DE VILBISS, OF TOLEDO, OHIO.

BONE-FORCEPS OR THE LIKE.

1,040,523.　　　　　Specification of Letters Patent.　　　Patented Oct. 8, 1912.

Application filed January 19, 1912. Serial No. 672,223.

*To all whom it may concern:*

Be it known that I, ALLEN DE VILBISS, a citizen of the United States, and a resident of Toledo, in the county of Lucas and State of Ohio, have invented a certain new and useful Bone-Forceps or the Like; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates more particularly to forceps of the rongeur or bone cutting type, and has for its object the provision, in an instrument of this character, of means which is automatically operable to decrease the leverage of the forceps handles upon the plunger or cutting tool as the cutting of a bite of bone or other material progresses whereby the cutting leverage is the greatest at the beginning of a cutting stroke of the plunger, thus materially facilitating a cutting of bone or other hard substance with instruments of this nature.

A further object of the invention is the provision of means, which in addition to serving to adjust the length of stroke of the plunger or cutting tool, is also operable to provide the tool handles with a constant or variable fulcrum, as desired.

The invention is fully described in the following specification, and while, in its broader aspect, it is capable of embodiment in numerous forms, a preferred embodiment thereof is illustrated in the accompanying drawings, in which,—

Figure 1 is a side elevation of an instrument embodying my invention in full open position, with parts broken away. Fig. 2 is a front end view thereof, with the handles broken away, and Fig. 3 is an enlarged side view of the front end portion thereof in the act of cutting a bone and with the handles partly compressed.

Referring to the drawings, 1 and 2 designate the two handle levers, the former of which is provided at one end with the head or enlargement 3 which is recessed or mortised longitudinally thereof or transversely of the handles to receive the plunger 4, as is customary in this type of instruments. The plunger is provided at its lower or cutting end with a hooked or forwardly projecting cutting nose 5, which is adapted to work up within the head recess and to coöperate with the lower end of such head in a cutting operation. The upper end of the plunger 4 is pivotally attached to the forward end of the handle 2.

In carrying out the feature of my invention I provide one of the handles, 1 in the present case, on the inner side thereof and adjacent to its fulcrum point with an inwardly projecting boss 6 which fits into a registering recess 7 in the inner side of the handle 2 and is provided in a plane, which is substantially transverse to the handles, with a slot 8 through which a pin that is attached to and connects the side walls of the recess 7, projects, thus connecting the handles for limited relative lateral movements at their fulcrum point.

The inner or adjacent faces of the handles 1 and 2 are oppositely rounded, or substantially so, adjacent to their points of connection to permit the handles to have a rearwardly rolling fulcrum upon a compression of the handles from their normal extended positions, as shown in Figs. 1 and 3, the pin 9 working down in the slot 8 during such rearwardly rolling action, as is apparent. A spring finger 10 is attached at its rear end to the handle 1 to the rear of its fulcrum and has its free end projecting forwardly and working against the handle 2 within the recess 7 thereof to normally tend to maintain the handles in open or expanded relation. It is apparent with this manner of connecting the handles that the distance between the fulcrum point of the handles and the point of attachment of the lever 2 to the plunger 4, which point is designated 11, is the shortest when the lever handles are in the full open position shown in Fig. 1, and that such distance gradually lengthens as the handles are drawn toward each other, due to the rearwardly rolling action of their fulcrum point, thus causing the greatest leverage to be exerted upon the cutting tool or plunger 4 at the beginning of its stroke, and effecting a gradual reduction of such leverage as the cutting stroke continues. It is found in practice that this feature adds very materially to the ease of operation of a tool of this class and allows the same to be operated with much less power being exerted upon the handles by the operator than is possible with the instruments of this class commonly employed.

To facilitate an adjustment of the opening action of the lever handles and a consequent adjusting of the length of the stroke of the plunger or cutting tool, I thread a screw 12 upwardly through the forward end portion of the handle 1 in position to bear against the inner side of the lever handle 2 in advance of the pin 9, or at substantially the shortest fulcrum point of the lever handles, as shown. This screw may be turned into the handle 1 sufficiently for its inner end to serve entirely as a fulcrum for the lever handle 2, thus providing a constant fulcrum therefor, or its inner end may be projected only a short distance beyond the inner face of the lever 1 to serve as a fulcrum for the lever handle 2 for the first portion of its compressing movement or until it has been compressed sufficiently relative to the lever handle 1 for the adjacent faces of the handles to abut as at 13 in Fig. 3, when the fulcrum point changes to reduce the leverage action, as is apparent by reference to Fig. 3.

A feature of my invention which simplifies and cheapens the cost of manufacture thereof consists in projecting the free end portion of the spring-finger 10 within the recess 7 of the handle 2, in the present case, with the outer side thereof, or that which is adjacent to the handle 2, bearing laterally near its end against the point 14 of the handle, said point being formed by the rear end wall of the recess 7, as shown. Upon a compressing of the handles the point 14 and spring have a slight sliding contact, but the free end of the spring never has contact with the base of the recess. It is found in practice that the coaction of the spring and handle in this manner very materially reduces the frictional action over that which would be present if the end of the spring had contact with the handle, and renders such action as free and easy as would be the case if an anti-friction roller were carried at the end of the spring for bearing against the handle.

I wish it understood that my invention is not limited to any specific construction or arrangement of the parts except in so far as such limitations are specified in the claims.

Having thus described my invention, what I claim as new and desire to secure by Letters Patent, is,—

1. In a bone forceps, a pair of coöperating levers one having a slotted part projecting from its inner surface adjacent to the fulcrum point and the other having a pin working in such slot, said levers having parts which coact to form a fulcrum which changes lengthwise of the instrument upon a working stroke of the levers.

2. In a bone forceps, a pair of operating levers having a rolling fulcrum connection which is changeable lengthwise of the levers upon a working stroke thereof, and means for adjusting the stroke of the levers.

3. In a bone forceps, a pair of operating levers having laterally movable pivotal connection adjacent their fulcrum point and having portions which coact upon a working stroke of the levers to decrease the leverage action thereof during such stroke, and means adjustable to change the length of stroke of the levers and to make the fulcrum constant or changeable.

4. In a bone forceps, a pair of operating levers having laterally movable pivotal connection and having parts in rolling contact and operable upon a working stroke of the levers to change the fulcrum point thereof lengthwise of the levers, and an adjusting screw threaded through one of the levers in advance of its point of connection with the other lever and being adjustable to coact with the other lever to provide a constant fulcrum therefor or to permit said levers to have a changing fulcrum.

5. In a bone forceps, a pair of levers having their forward ends in rolling contact to effect a gradual decreasing of the leverage action when the handle portions of the levers are moved toward each other, one lever having a cutter head and the other having a cutting plunger for coöperating with the head to cut matter when the lever handles are moved toward each other, and loose connection between the rolling portions of said levers for limiting and guiding their rolling movements.

6. The combination with a pair of hinged handles, one having a longitudinally extending recess, of a spring-finger disposed between such handles and fixed to one with its free end working in said recess free from contact with the base wall thereof and being in lateral contact near its end with an end wall of such recess.

In testimony whereof, I have hereunto signed my name to this specification in the presence of two subscribing witnesses.

ALLEN DE VILBISS.

Witnesses:
C. W. OWEN,
M. Q. OPPENHEIM.